United States Patent [19]
Fried et al.

[11] 3,906,038
[45] Sept. 16, 1975

[54] 2-(6-SULFO-2-NAPHTHYL)PROPIONIC ACID
[75] Inventors: John H. Fried; Ian T. Harrison, both of Palo Alto, Calif.
[73] Assignee: Syntex Corporation, Panama, Panama
[22] Filed: Jan. 17, 1973
[21] Appl. No.: 324,507

Related U.S. Application Data
[62] Division of Ser. No. 862,490, Sept. 30, 1969, abandoned.

[52] U.S. Cl............ 260/507 R; 260/470; 260/473 R; 260/501.18; 260/515 A; 260/520; 260/525; 424/317
[51] Int. Cl.² ........................................ C07C 143/52
[58] Field of Search ............................... 260/507 R

[56] References Cited
OTHER PUBLICATIONS
Fried et al., Chem. Abstract, 71 91162j (1969).

Primary Examiner—Joseph E. Evans
Assistant Examiner—Nicky Chan
Attorney, Agent, or Firm—Joseph I. Hirsch; William B. Walker

[57] ABSTRACT 2-(6-Methoxy-2-naphthyl)propionic acid is prepared by reacting 2-(6-sulfo-2-naphthyl)propionic acid, a novel compound, with an alkali metal or alkaline earth metal methoxide in the presence of a cuprous halide in a heterocyclic nitrogeneous base solvent at a temperature of at least 150°C until methanolysis occurs, and then acidifying the reaction mixture. The product compound has anti-inflammatory, analgesic and antipyretic activities.

1 Claim, No Drawings

2-(6-SULFO-2-NAPHTHYL)PROPIONIC ACID

This is a division of application Ser. No. 862,490 filed Sept. 30, 1969, now abandoned.

This invention relates to an intermediate for use in a process for preparing 2-(6-methoxy-2-naphthyl)propionic acid. More particularly, this invention relates to 2-(6-sulfo-2-naphthyl)propionic acid.

In general, the process for preparing 2-(6-methoxy-2-naphthyl)propionic acid comprises the steps of reacting a 2-(6-substituted-2-naphthyl)propionic acid with an alkali metal or magnesium methoxide in the presence of a cuprous iodide, bromide or chloride in a heterocyclic nitrogeneous base solvent at a temperature of at least 150°C until methanolysis occurs, wherein the substituent at the 6-position of the 2-(6-substituted-2-naphthyl)propionic acid is a chloro, bromo, iodo or sulfo group; acidifying the reaction mixture; and separating 2-(6-methoxy-2-naphthyl)propionic acid from the reaction mixture. Preferably either the product is resolved or the starting compound is a d 2-(6-substituted-2-naphthyl)propionic acid whereby d 2-(6-methoxy-2-naphthyl)propionic acid is obtained as the final product.

The above-described process can be represented by the following formulas:

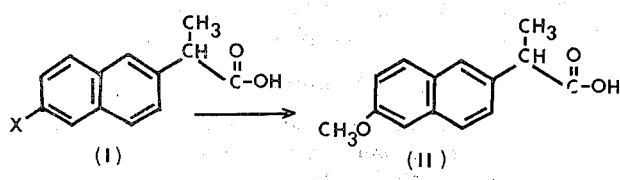

In the above formula, X is a chloro, bromo, iodo or sulfo group.

The first step of the above-described process comprises reacting a compound of Formula I with an alkali metal or magnesium methoxide in the presence of a cuprous halide in a heterocyclic nitrogeneous base solvent. Preferably, at least one molar equivalent of the metal methoxide is used. Suitable alkali metal methoxides include lithium, sodium, and potassium methoxide. Suitable cuprous halides include cuprous iodide, cuprous bromide and cuprous chloride.

Suitable heterocyclic nitrogeneous base solvents include collidine, the lutidines such as 2,6-lutidine, quinoline, isoquinoline, the picolines including $\alpha,\beta$ and $\gamma$-picoline, and pyridine. The preferred hererocyclic nitrogeneous base solvents have a boiling point of at least 150°C and include collidine, and lutidines and quinoline.

The reaction is carried out at a temperature of at least 150°C until methanolysis occurs, preferably at a temperature of from 150 to 220°C. Methanolysis of the 6-substituent of the compound of Formula I is usually achieved within from 0.5 to 24 hours, the time being dependent upon the reaction temperature.

The reaction mixture is then acidified. Any organic or inorganic acid can be used such as acetic acid, trifluoroacetic acid, p-toluenesulfonic acid, sulfuric acid, hydrochloric acid, hydrobromic acid, hydroiodic acid, and the like.

The compound of Formula II is then separated from the reaction mixture by conventional procedures. For example, the reaction mixture can be extracted with ether, and the ether phase washed with dilute acid and with water, dried and evaporated to yield the compound of Formula II. Other techniques such as chromatography can also be used.

The preferred product is d 2-(6-methoxy-2-naphthyl)propionic acid. To obtain this product, optical resolution of the compound of Formula II can be achieved by selective biological degradation or by preparation of diastereo isomer salts of the 2-(6-methoxy-2-naphthyl)propionic acid with a resolved optically active amine base such as cinchonidine and then separating the thus formed diastereo isomers by fractional crystallization. The separated diastereo isomer salts are then acid cleaved to yield the respective d 2-(6-methoxy-2-naphthyl)propionic acid. Alternatively, resolution of the compounds of Formula I can be achieved as described above (for example using cinchonidine), in which case the compounds of Formula I employed in the reaction would be the preferred d-isomer.

The compound of Formula I where X is chloro and methods for its preparation have been described in copending U.S. applications Ser. No. 608,997 filed Jan. 13, 1967, now abanded, Ser. No. 694,771 filed Dec. 7, 1967, now abandoned, and Ser. No. 810,014 filed Mar. 24, 1969, now abandoned the pertinent disclosures of which are incorporated herein by reference. One method suitable for preparing compounds of Formula I (wherein X is chloro, bromo or iodo) involves the reaction of the known $\beta$-halo substituted naphthalenes (wherein the halo group is chloro, bromo or iodo) with acetyl chloride in nitrobenzene in the presence of at least 3 molar equivalents of aluminum chloride to yield the corresponding 6-halo-2-acetylnaphthalene.

This is heated with morpholine in the presence of sulfur at about 150°C. The resulting product is refluxed with concentrated hydrochloric acid to yield the corresponding 2-(6-halo-2-naphthyl)-acetic acid. The addition of the $\alpha$-methyl group can be achieved by several techniques. For example, the 2-(6-halo-2-naphthyl)-acetic acid can be esterified such as by treatment with a diazoalkane such as diazomethane in ether, or with an alkanol such as methanol in the presence of boron trifluoride to yield the corresponding alkyl ester. The ester product is then treated with sodium hydride in an ether solvent such as 1,2-dimethoxyethane, and then treated with a methyl halide such as methyl iodide to yield the corresponding 2-(6-halo-2-naphthyl)propionic acid ester. The ester can be hydrolyzed, for example by alkaline hydrolysis, to yield the 2-(6-halo-2-naphthyl)propionic acids of Formula I.

The 2-(6-sulfo-2-naphthyl)propionic acid of Formula I can be prepared from the corresponding methyl 2-(2-naphthyl)propionate, a known compound, by treating it with chlorosulfonic acid in a suitable organic solvent such as carbon tetrachloride to form the corresponding 2-(6-chlorosulfonyl-2-naphthyl)-propionate. The solvent is removed. Water is then added to the reaction mixture, and it is heated under reflux to yield the corresponding 2-(6-sulfo-2-naphthyl)propionate which hydrolyzes to form the corresponding 2-(6-sulfo-2-naphthyl)propionic acid of Formula I.

The compounds of Formula II exhibit anti-inflammatory, analgesic and anti-pyretic activity and are accordingly employed in the treatment of inflammation, pain and pyrexia in mammals. For example, inflammatory conditions of the muscular skeletal system, skeletal joints and other tissues can be treated. Accordingly, this compound is useful in the treatment of conditions characterized by inflammation such as rheumatism, concussion, laceration, arthritis, bone fractures, post-traumatic conditions and gout.

This invention is further illustrated by the following specific but non-limiting examples.

EXAMPLE 1

A solution of 5 g. of methyl 2-(2-naphthyl)propionate in 10 ml. of carbon tetrachloride is treated with 6 g. (2 equivalents) of chlorosulfonic acid and maintained at about 20°C for 24 hours. The solvent is removed in vacuo, 15 ml. of water is added to the residue, and the resulting mixture is heated under reflux for 24 hours. The reaction mixture is then evaporated to dryness, and the residue is recrystallized from ether-ethanol to yield 2-(6-sulfo-2-naphthyl)propionic acid.

EXAMPLE 2

To a mixture of 1.6 g. of 2-bromonaphthalene, 1.6 g. of acetyl chloride, and 20 ml. of nitrobenzene, there are added 4.0 g. of aluminum chloride. The resulting mixture is stirred for 48 hours at 25°C; then it is washed with water until free of chloride ion. The mixture is dried over sodium sulfate and evaporated under reduced pressure. The residue, 2-acetyl-6-methoxynaphthalene, is refluxed in 2 ml. of morpholine containing one-half gram of sulfur for two hours; the reaction mixture is then filtered and evaporated. The resulting reaction derivative is extracted with diethyl ether; the extracts are combined and evaporated. The residue is refluxed in 10 ml. of concentrated hydrochloric acid for two hours, cooled to 25°C, and neutralized with aqueous sodium hydroxide. The mixture is then extracted with ether and the extracts are combined, washed with water to neutrality, dried and evaporated to yield 2-(6-bromo-2-naphthyl)acetic acid.

Similarly, 2-(6-chloro-2-naphthyl)acetic acid and 2-(6-iodo-2-naphthyl)acetic acid are prepared from the corresponding β-substituted naphthalenes by means of the above process.

To a mixture of 22 g. of methyl 2-(6-bromo-2-naphthyl)acetate (prepared by treating 20.5 g. of 2-(6-bromo-2-naphthyl)acetic acid with 4.5 g. of diazomethane in ether), and 2.5 g. of sodium hydride in 150 ml. of 1,2-dimethoxyethane; 25 g. of methyliodide are added. The reaction mixture is allowed to stand for several hours; then it is diluted with ethanol followed by water and extracted with methylene chloride. The extracts are combined, washed with water to neutrality, dried over sodium sulfate, filtered and evaporated to yield methyl 2-(6-bromo-2-naphthyl)propionate. This is added to a mixture of 15 g. of sodium carbonate, 200 ml. of methanol and 25 ml. of water. The reaction mixture is allowed to stand for 24 hours; then the mixture is acidified with 200 ml. of two normal hydrochloric acid. The acidified mixture is extracted with methylene chloride; the extracts are combined, washed with water, dried over sodium sulfate and evaporated to yield 2-(6-bromo-2-naphthyl)propionic acid.

Similarly, the 2-(6-chloro-2-naphthyl)propionic acid and 2-(6-iodo-2-naphthyl)propionic acid are prepared from the corresponding 2-(6-substituted-2-naphthyl)acetic acid derivatives.

EXAMPLE 3

A solution of 5 g. of 2-(6-chloro-2-naphthyl)propionic acid in 50 ml. of collidine containing 5 g. of sodium methoxide and 2 g. of cuprous iodide is refluxed for 6 hours. The mixture is then acidified with excess dilute hydrochloric acid and extracted with ether. The ether phase is washed with dilute hydrochloric acid and with water, and is then dried and evaporated to dryness to yield 2-(6-methoxy-2-naphthyl)propionic acid.

EXAMPLE 4

A solution of dl 2-(6-methoxy-2-naphthyl)propionic acid in methanol is prepared by dissolving 230 g. of the product of Example 3 in 4.6 l. of warm methanol. The resulting solution is boiled until it becomes turbid; then sufficient methanol is added to make the solution clear again. This hot solution is added to a solution of 296 g. of cinchonidine in 7.4 l. of methanol heated to about 60°C. The solutions are combined while stirring, and the combined mixture is then allowed to reach room temperature over a 2 hour period. After the reaction mixture has reached room temperature, it is stirred for an additional 2 hours and then filtered. The filtered solids are washed with several portions of cold methanol and dried.

100 Grams of the cinchonidine salt crystals are added to a stirred mixture of 600 ml. of ethyl acetate and 450 ml. of a 2 N aqueous hydrochloric acid. After the mixture has been stirred for 2 hours, the ethyl acetate layer is removed and washed with water to neutrality, dried over sodium sulfate and evaporated to yield d 2-(6-methoxy-2-naphthyl)propionic acid.

We claim:
1. 2-(6-sulfo-2-naphthyl)propionic acid.

* * * * *